Nov. 9, 1965
S. A. MINERA
3,216,147
FISHING KITE
Filed Aug. 17, 1961
3 Sheets-Sheet 1
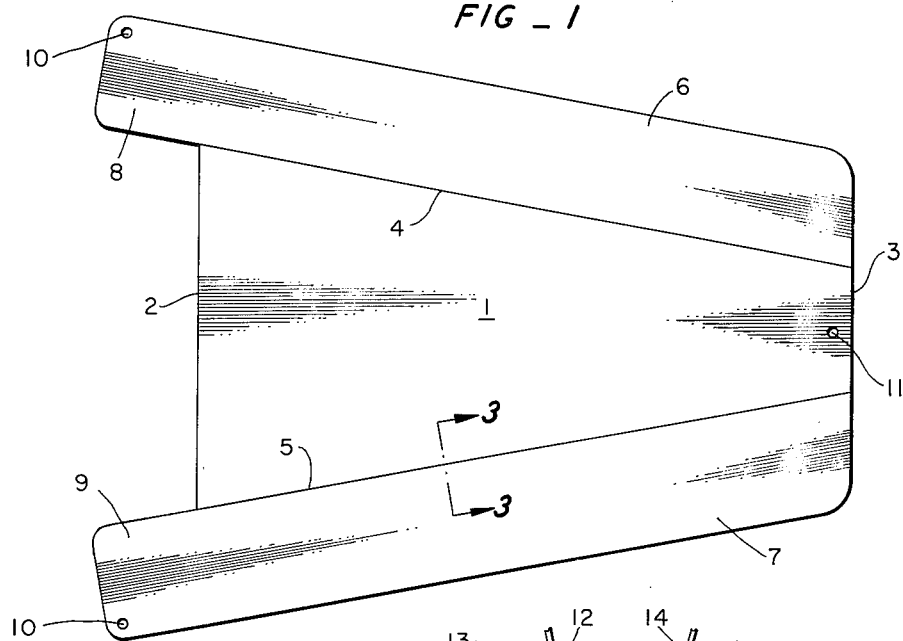
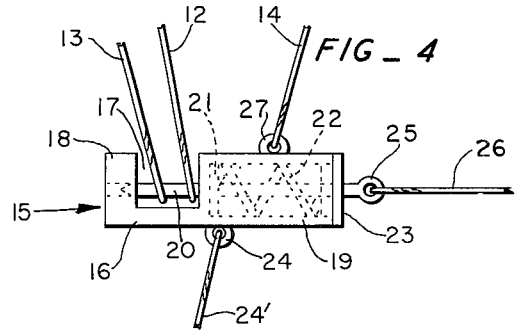
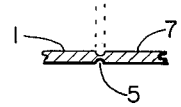
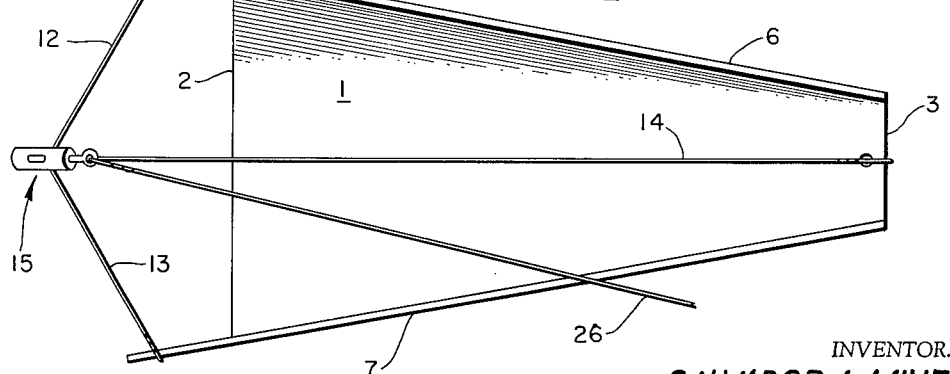
INVENTOR.
SALVADOR A. MINERA
BY
Boyken, Mohler & Wood
ATTORNEYS Nov. 9, 1965     S. A. MINERA     3,216,147
FISHING KITE
Filed Aug. 17, 1961     3 Sheets-Sheet 2
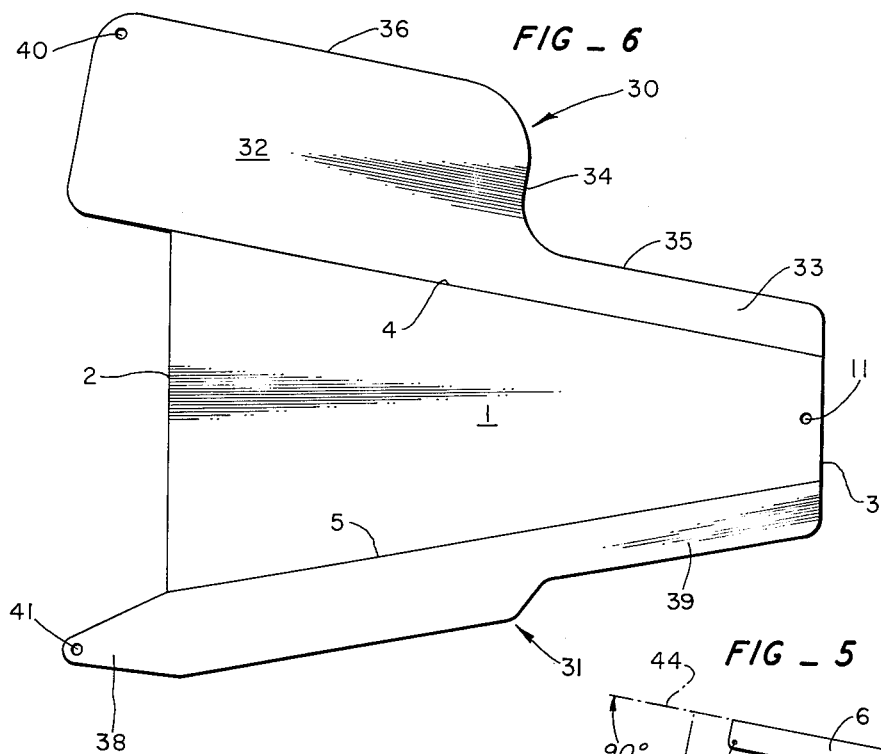
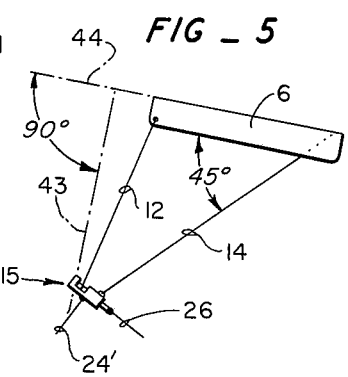
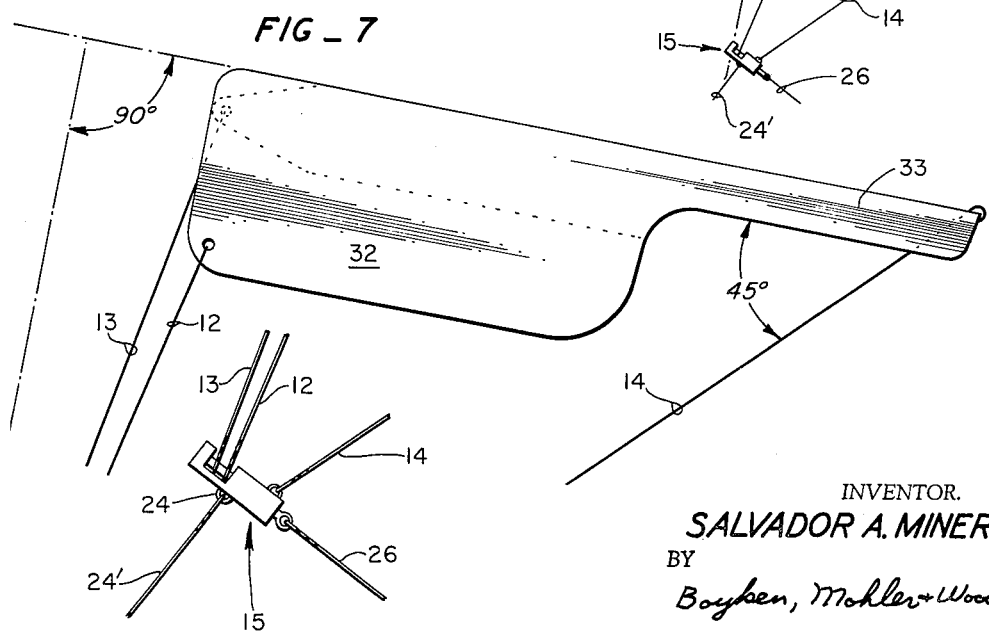
INVENTOR.
SALVADOR A. MINERA
BY
Boyken, Mohler + Wood
ATTORNEYS

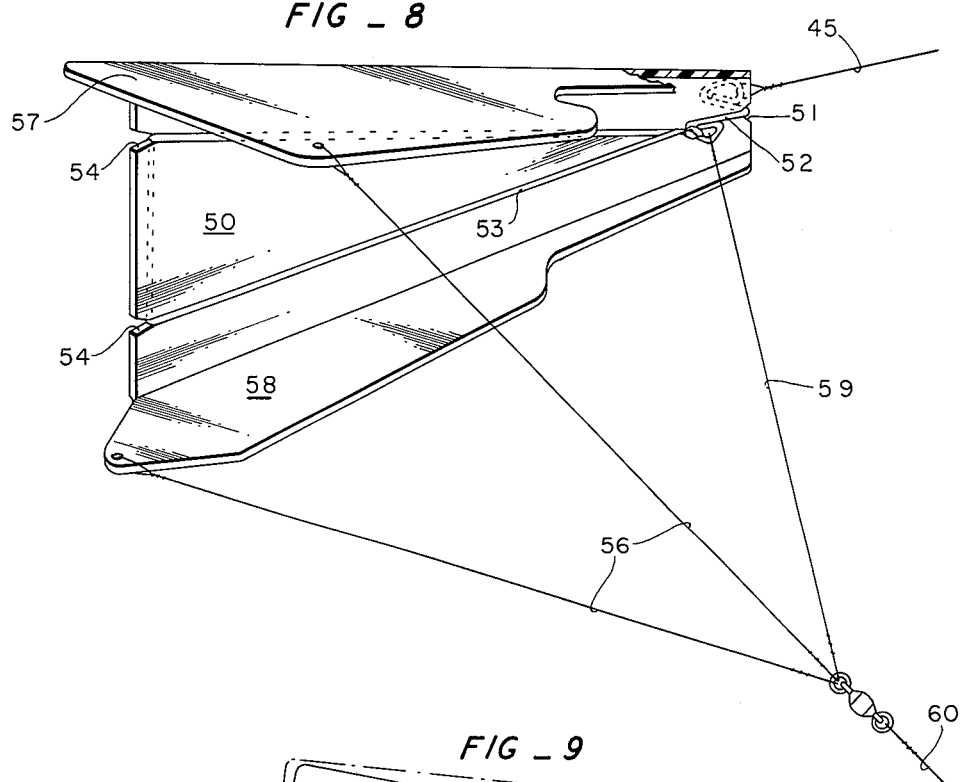
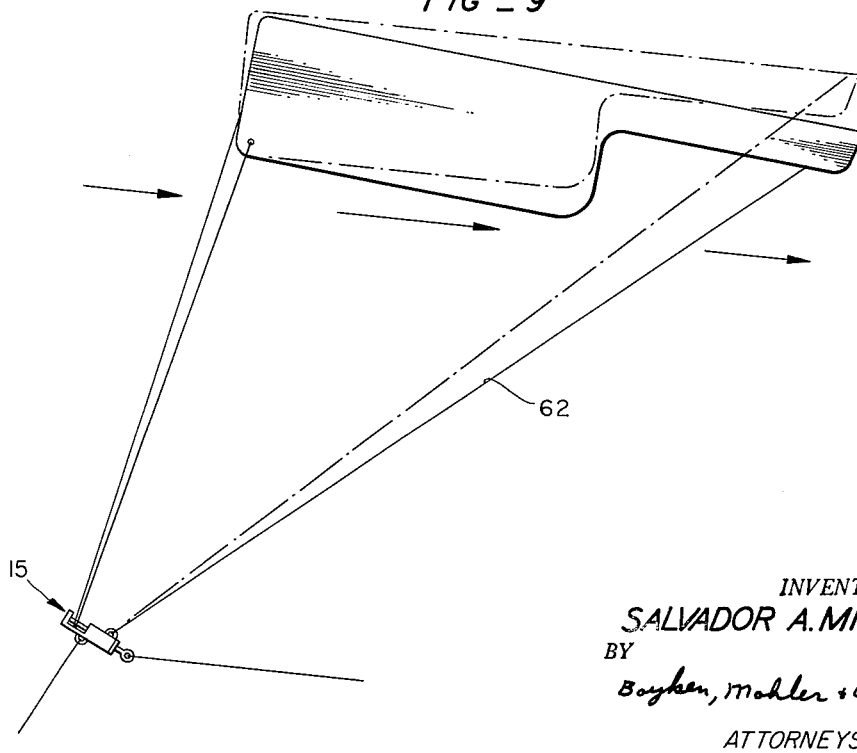

United States Patent Office 3,216,147
Patented Nov. 9, 1965

3,216,147
FISHING KITE
Salvador A. Minera, 1500 Judah St., No. 10,
San Francisco, Calif.
Filed Aug. 17, 1961, Ser. No. 132,179
3 Claims. (Cl. 43—43.13)

This invention relates to a fishing kite, and has for one of its objects the provision of a fishing kite that is somewhat similar in many respects with the kite shown in my United States Letters Patent No. 3,044,208 of July 17, 1962.

One of the objects of the present invention is the provision of improved more economical structure than is shown in said application.

Another object of the invention is the provision of a kite release means for releasing the kite upon hooking a fish that is different from the one shown in said application and that is an improvement therefor in certain respects.

A still further object of the invention is the provision of a kite that is adapted to carry the lure and hook or hooks downwardly into a body of water during trolling whereby the lure will be positioned at the desired depth for fish that customarily are found at a substantial depth below the surface.

At the present time weights are used to carry the lure to the desired depth, which weights are connected with the fishing line by a sinker release mechanism. When a fish strikes the hook the sinker is released and lost, irrespective of whether the fish is actually securely hooked, with the result that the sinker is lost and the line must be pulled in to attach another sinker.

I am aware that kites have been used for the purpose of carrying the lure on a trolling line downwardly during trolling, but in most instances the kite is provided with a weighted head to cause it to descend.

With the present invention the kite that is employed is very light and rugged and carries the lure downwardly to the desired depth immediately upon trolling. A bridle connecting the line with the kite includes a release that immediately releases a portion of the kite upon a fish being hooked, so that the kite will no longer be operative but will not be lost.

A still further object of the invention is the provision of a specific relationship between the bridle and the kite that enables the kite to automatically position itself at the most desired place in the water relative to the user, whether the kite is for surface use as disclosed in said patent or for depth use as described heretofore.

Other objects and advantages will appear in the description and in the drawings:

In the drawings, FIG. 1 is a plan view of a depth type kite blank having wings swingable from one of the sides of the blank to the other, according to the side at which the fisherman stands.

FIG. 2 is a side elevational view of a kite formed from the blank of FIG. 1 connected to a bridle and having a kite release at the connection between the fishing line and the bridle and the connection between the lure and the release.

FIG. 3 is an enlarged sectional view of the hinge portion between one of the wings on the kite of FIG. 2 and the body portion.

FIG. 4 is an enlarged elevational view of the lure release shown in FIG. 2.

FIG. 5 is a reduced size top plan of the kite of FIG. 1 when in use showing the angular relationship between the bridle lines and the kite when the fishing line is taut.

FIG. 6 is a plan view of a blank for a surface kite and FIG. 7 is a top plan view of the kite of FIG. 6 when the latter is in use.

FIG. 8 is a perspective view of a modified form of kite, when in use, having exactly the same blank structure as the blank of FIG. 6 but a different bridle release and bridle.

FIG. 9 is a reduced plan view of a kite having the same blank structure and bridle release as in FIG. 7 but having a modified bridle.

In the drawings, the blank of FIGS. 1 and 6 are of plastic material and each has a central elongated body portion 1 tapering from the leading edge 2 to the trailing edge 3, the longitudinally extending edges being defined by rearwardly convergently extending scores 4, 5, molded or formed in the sides of the sheet as seen in FIG. 3 to provide hinge lines for swinging the portions outwardly of these hinge lines to one side or the other of the body portion 1.

In FIG. 1 the portions 6, 7 that are along lines 4, 5 and outwardly of the body portion 1, are of equal width from end to end thereof and each projects forwardly of the leading edge 2 a relatively short distance as at 8, 9, while the rear or trailing edges may be in extension of the trailing edge 3 of the body portion.

The leading outer corners of the forwardly projecting portions 8, 9 may each be formed with an opening 10 for connecting one of the ends of a pair of bridle lines thereto, while the rear end of the body portion may be formed with an opening 11 for the end of a third bridle line.

In FIG. 2 the forward pair of bridle lines are designated 12, 13 while the third bridle line connected with the rear end of body portion 1 is designated 14.

These bridle lines 12–14 extend convergently from the kite to a bridle release device generally designated 15.

This bridle device comprises a generally tubular body member 16 (FIG. 4) having a through open ended bore, but cut away at one side as at 17 to provide a gap between end portions 18, 19 of the member.

A pin 20 is adapted to extend through said tubular member and across the gap between said end portions 18, 19. End portion 19 may be slightly longer than the end portion 18 and the bore is enlarged to receive a collar 21 that is secured on said pin 20, while a compression spring 22 reacts between collar 21 and a head 23 on the outer end of portion 19 to yieldably hold the inner end of pin 20 in a position extending across the gap between end portions 18, 19.

The outer end of pin 20 may be formed with an eye 25 to which the line 26 leading to and connected with the lure and hook or hooks is secured.

Body 15 also is formed with an eye 27 to which the convergent end of bridle line 14 is secured, while bridle lines 12, 13 have eyes at their convergent ends through which the pin 20 extends at the gap 17 in the side of body 15. Also an eye 24 is formed on said body for connection with the line 24' leading to the fisherman.

From the foregoing it will be seen that a fish taking the hook on line 26 will pull the pin out of the eyes on bridle lines 12, 13 permitting the bridle to be released, except for the connection between the bridle line 14 and the kite. Thus there will be no lateral pulling tension on the wings 6, 7 once lines 12, 13 are released.

Referring to FIGS. 6, 7 identically the same bridle and bridle release are used as in FIGS. 1–4 hence they are given the same numbers, and this bridle release functions in exactly the same manner as described for the bridle release of FIGS. 1–4.

The kite of FIGS. 1–4 is a depth kite, while the kite of FIGS. 6, 7 is a surface kite.

In FIG. 6 it will be seen that the wings 30, 31 that are outwardly of the hinge lines 4, 5 differ from the wings 6, 7 of FIG. 1 in that the wing 30 is appreciably wider at its forward end portion 32 than at its rear end portion 33, said forward portion terminating at its rear outer edge in a curved rear edge 34 that faces generally rearwardly and that merges with the straight outer edge 35 of rear portion 33. The outer edges 36, 35 of portions 32, 33 are preferably substantially parallel with hinge line 4.

The wing 31 is substantially narrower than the forward portion 32 of wing 30 and the forwardly projecting end portion 38 may be narrowed down to a generally pointed end. However, both of the portions of wings 30, 31 project forwardly of the leading edge 2 of the body portion in the same manner as projections 8, 9 of FIG. 1.

Approximately the leading half of the wing 31 is wider than the trailing half 39 and the latter is approximately the same width as the trailing portion 33 of wing 30.

The leading portions 32, 38 of the wings 30, 31 are formed with openings 40, 41 adjacent to the outer edges of said portions for connecting one of the ends of bridle lines 12, 13 thereto, while opening 11 in the blank of FIG. 1 is for the third line 14 of the bridle.

The arrangement of the bridle lines 12, 13 in both of the kites is such that the bridle release, or convergent ends of the bridle lines will be at a point on an imaginary line 43 (FIG. 5) spaced slightly forwardly of the leading end of the kite, and which line 43 is perpendicular to the medial line 44 of the kite, longitudinally of the latter, the bridle line 14 in this arrangement will be at an angle of substantially 45° to the medial line 44. The said device 15 is substantially in the medial plane of the body portion 1 that is on line 44.

In the depth kite, when the latter is placed in the water and is trolled, it will immediately dive at an angle to a predetermined depth behind the boat that carries the fisherman, and when a fish is hooked, the pin 20 will be pulled to release the bridle lines 12, 13.

In the surface kite the wing 32 will be uppermost, with the edge 2 facing upstream, since this kite is mainly used in rivers and in flowing streams. However, it may also be trolled in lake water or still water and the wing 32 will be in the same upper position at the surface of the water. Upon a fish taking the hook, the bridle lines 12, 13 are released in exactly the same way as in the case of the depth kite.

The relationship between the bridle lines and the kite is quite important in that it prevents the kite from either going so far down in the water in the case of the depth kite or so far forward of the fisherman, in the case of the surface kite, as to result in the water pressure on the central body portion striking the side of the kite that is opposite to the side from which the wings extend.

The provision of the wings extending the full length of the kite body 1 is important in that it enables the use of lighter, hence more economical material since the wing sections 33, 39 will brace the trailing part of the body portion 1 against bending under the pressure of the water.

The above reinforcing of the body portion and the channelling effect of the two wings for the full length of the body, naturally steadies or stabilizes the kite.

The plastic is of a character that enables flexing along the lines 4, 5 an indefinite number of times without weakening the plastic, and the material along said lines may be quite thin so as to enable easy flexing therealong.

Insofar as the blank itself is concerned, this may be substantially the same irrespective of the type of bridle release that is used.

For example, in FIG. 8 the bridle release is of the same general type shown in my United States Letters Patent 2,862,326 of December 2, 1958 and as shown in my copending application for United States Letters Patent 2,455 filed January 14, 1960, now Patent No. 3,044,208, issued July 17, 1962.

The kite blank itself may be identical with those shown in FIGS. 1 and 6, except that the rear edge of the central body portion 50 is centrally notched at 51 for engagement with the releasable hook, one arm 52 of which is connected by a rubber band 53 extending across the face of the kite, under tension, with the leading edge of the kite where the band extends through notches 54 in said leading edge and across the marginal portion along said leading edge.

The line 45 to the hook, lure or bait is connected with the other arm of the releasable hook, while the rear edge of the body portion 50 of the kite is seated in the reentrant angle of the hook.

The two forward bridle lines 56 are connected at one of their ends to the forward ends of the upper and lower wings 57, 58 exactly the same as in FIGS. 2, 5 and 7 while the rear bridle line 59 is connected at one of its ends with the arm 52 of the release hook. The other ends of lines 56, 59 are connected with the fishing line 60 that leads to the fisherman, and they are connected so that their point of connection is at the same location as the point where lines 12, 13 and 14 of FIGS. 5 and 7 are connected with the fishing line.

This bridle may be the same as shown in said copending application, or the rear line may be of elastic material, such as rubber, or at least a section thereof may be stretchable.

FIG. 9 shows the same structure as in FIGS. 5, 7 except that the rear line 62 may be of rubber or the like to permit stretching.

This construction, in which the rear line is elastic, is particularly suitable for use on the larger sized kites carrying large lures in order to automatically reduce the drag on the fishing line, or the degree of pull on said line where the current is strong. Since the kite in such instance may pass into and out of areas in a river where there are variations in the current, a bridle adjustment for a normal current may result in an excessively strong pull on the line in a faster current, but with the elastic rear bridle line the kite will automatically tend to adjust its position to be parallel with the stream without necessarily moving upstream, since a large lure on the kite will tend to carry the kite downstream.

It is to be understood that the advantages of the blank structure itself, as shown in FIGS. 1 and 6, are common to all of the bridle arrangements illustrated, and that the claims appended hereto are intended to cover modification of the kite and bridle structure that may come within the spirit of the invention and the scope of the claims.

Also, while the kite may be said to be formed with lines of weakness along which the wings are bendable, this does not necessarily mean that the blank is weaker along these lines, but merely that the blank is readily bendable along said lines for swinging the wings to one side or the other of the central body portion.

Common to all forms of the invention, and different from the disclosures in said copending application and in said patent, is the provision of a one-piece kite body in which the elongated wings that extend longitudinally of the elongated central body portion extend substantially from end to end of said central body portion thereby stiffening the latter against flexing under the force of the current, and also channeling the water passing between the wings so that the water in the channel will not be dissipated or released from the channel until it reaches the trailing end of the central body portion. This has a stabilizing effect.

Also common to all species is the specific position of the connection between the bridle lines and the fishing line, whether or not the bridle release is at this point or at the trailing end of the kite herein shown and described.

The difference in structure between the depth kites of FIGS. 1, 3, 4 and 5 and the surface kites of FIGS. 6–8 is that the wings 6, 7 of the depth kite are of equal width from end to end thereof and symmetrical at opposite sides of a medial line extending longitudinally thereof, hence gravity plus the force of the current will cause the kite to move downwardly under the influence of a current of water or of the water when trolling. In the knite of FIGS. 6–9 the upper wing 6 is wider at its leading end portion than the leading end portion of the diving kite, hence the force of the water against this larger area will be greater than that of the correspondingly positioned area on the lower wing, and the kite will be retained at the surface of the water.

I claim:

1. A fishing kite comprising:
   (a) an elongated central body of planar sheet material terminating in a leading edge and a trailing edge at opposite ends thereof respectively;
   (b) said body having straight edges extending convergently from said leading edge to said trailing edge whereby said body is wider at said leading edge than at said trailing edge;
   (c) wings integral with said body along said straight edges projecting angularly from said body to the same side thereof;
   (d) said wings extending substantially from said leading edge to said trailing edge to reinforce said body against flexing in a direction transversely of the plane thereof;
   (e) a bridle having flexible lines respectively connected at one of their ends with the ends of said wings that are adjacent to said leading edge and with the end of said body adjacent to said trailing edge;
   (f) means for connecting the other ends of said lines of said bridle with a fishing line;
   (g) the end portions of said wings that are adjacent to said leading edge being wider than their opposite end portions that are adjacent to said trailing edge;
   (h) the line of said bridle that is connected with said end of said body adjacent to said trailing edge being elastic to permit stretching thereof upon a predetermined pressure against the side of said body to which said wings extend to enable said kite to change its position when in the water upon changes in the pressure of water against said last mentioned side of said body.

2. A blank for a fishing kite to be used in water comprising:
   (a) a one piece, planar, elongated sheet of relatively rigid material weakened along a pair of spaced lines in side-by-side relation extending convergently from one end of said sheet to the other to facilitate yieldable swinging of the portions of said sheet outwardly of and along said pair of lines to one side or the other of the portion between said pair of lines;
   (b) said portions along and outwardly of said pair of lines extending substantially from end to end of the portion of said blank between said lines providing a pair of elongated, relatively narrow wings each being parallel with the line adjacent thereto, whereby said wings extend convergently from one end of said sheet to the other;
   (c) said portion between said lines and wings being planar and comprising the main body of said kite and being elongated longitudinally of said wings and being reinforced by said wings against distortion out of the plane thereof when said kite is in use and when said pair of wings are swung to one side or the other of said body in positions substantially at right angles to the plane of said body;
   (d) means on said wings at the ends thereof adjacent to said one end of said sheet for securing one of the ends of a pair of bridle lines of a flexible three-line bridle thereto and means on said body midway between the convergently disposed ends of said wings for securing one end of the third line of such bridle thereto;
   (e) one of the end portions of said wings at one of the ends of said body being wider than the opposite end portions at the other end of said body, and each end portion of each wing being approximately of uniform width.

3. A fishing kite comprising:
   (a) an elongated central, planar body of relatively rigid sheet material terminating in a leading edge and a trailing edge at opposite ends thereof respectively;
   (b) said body having straight side edges extending convergently from said leading edge to said trailing edge whereby said body is wider at said leading edge than at said trailing edge;
   (c) a pair of elongated wings integral with said body along and extending longitudinally of said side edges from end to end of said body and projecting angularly from said body to the same side thereof, thereby reinforcing said body against flexing in a direction transversely of the plane thereof;
   (d) a bridle having flexible bridle lines respectively connecting at one of their ends with the ends of said wings that are adjacent to said leading edge and with the end of said body adjacent to said trailing edge;
   (e) connecting means connecting the opposite ends of said bridle lines at a point that is spaced from the side of said body to which said wings project and that is on a line spaced outwardly and forwardly of said leading edge and perpendicular to an extension of the medial longitudinal line of said body and in a plane perpendicular to and bisecting said body longitudinally thereof, when said bridle lines are taut;
   (f) said connecting means being adapted to be connected to one end of a fishing line;
   (g) a hook line for a fish hook;
   (h) said connecting means including movable bridle release means releasably connecting one of said bridle lines with said connecting means at said point, and said bridle release means having means for movement to release said one of said bridle lines upon being pulled;
   (i) said hook line being connected at one end thereof to said bridle release means for pulling the latter to release said one of said bridle lines upon the pull of a fish on said hook line whereby said hook line will be connected with said fish line through said connecting means at a point spaced from said kite and externally of said kite upon release of one of said bridle lines from said kite.

References Cited by the Examiner
UNITED STATES PATENTS

| | | | |
|---|---|---|---|
| 2,247,583 | 7/41 | Louthan | 43—43.13 |
| 2,716,832 | 9/55 | Minnie | 43.13 X |
| 2,770,406 | 11/56 | Lane | 229 |
| 2,914,878 | 12/59 | Persson et al. | 43—9 |
| 2,914,883 | 12/59 | Kustusch. | |
| 3,007,659 | 11/61 | Zachary. | |
| 3,044,208 | 7/62 | Minera | 43—43.13 |

ABRAHAM G. STONE, *Primary Examiner.*

JOSEPH S. REICH, *Examiner.*